United States Patent
Hiramoto et al.

(10) Patent No.: US 6,475,544 B1
(45) Date of Patent: Nov. 5, 2002

(54) ANTI-DETERIORATION AGENT FOR FOOD FLAVORS, METHOD FOR PREVENTING DETERIORATION OF FOOD FLAVORS, AND FOODS CONTAINING ANTI-DETERIORATION AGENT FOR FOOD FLAVORS

(75) Inventors: Tadahiro Hiramoto, Kanagawa (JP); Kenji Saiki, Kanagawa (JP); Satoshi Masumura, Kanagawa (JP); Toru Shimizu, Kanagawa (JP); Tomoya Yamashita, Kanagawa (JP); Nobutada Kaneko, Kanagawa (JP); Yoshihiko Maruta, Kanagawa (JP)

(73) Assignee: Takasago International Corporation, Tokyo (JP)

( * ) Notice: Subject to any disclaimer, the term of this patent is extended or adjusted under 35 U.S.C. 154(b) by 29 days.

(21) Appl. No.: 09/653,781

(22) Filed: Sep. 1, 2000

(30) Foreign Application Priority Data

Sep. 2, 1999 (JP) .............................. 11-249336
Aug. 22, 2000 (JP) ........................ 2000-250700

(51) Int. Cl.$^7$ ............................................... A23L 1/22
(52) U.S. Cl. ................... 426/321; 426/534; 426/590; 426/599
(58) Field of Search ................. 426/590, 599, 426/534, 321

(56) References Cited

U.S. PATENT DOCUMENTS 4,201,639 A * 5/1980 Light et al. ................. 204/158

FOREIGN PATENT DOCUMENTS

DE 1768089 * 10/1971

OTHER PUBLICATIONS

Arctander, S. 1969. Perfume and Flavor Chemicals I. Published by the Author, Montclair, NJ, p. 704.*

Ashurst et al. 1995. Food Flavorings, Blackie Academic and Professional, London, p. 209, 210.*

* cited by examiner

Primary Examiner—Helen Pratt
(74) Attorney, Agent, or Firm—Sughrue Mion, PLLC

(57) ABSTRACT

Disclosed is an anti-deterioration agent for food flavors which comprises at least one coumarin derivative represented by formula (I):

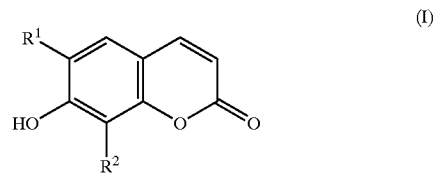

wherein $R^1$ represents a hydrogen atom, a hydroxyl group or a methoxy group, and $R^2$ represents a hydrogen atom or a hydroxyl group, provided that $R^1$ and $R^2$ do not represent a hydrogen atom simultaneously.

16 Claims, 3 Drawing Sheets

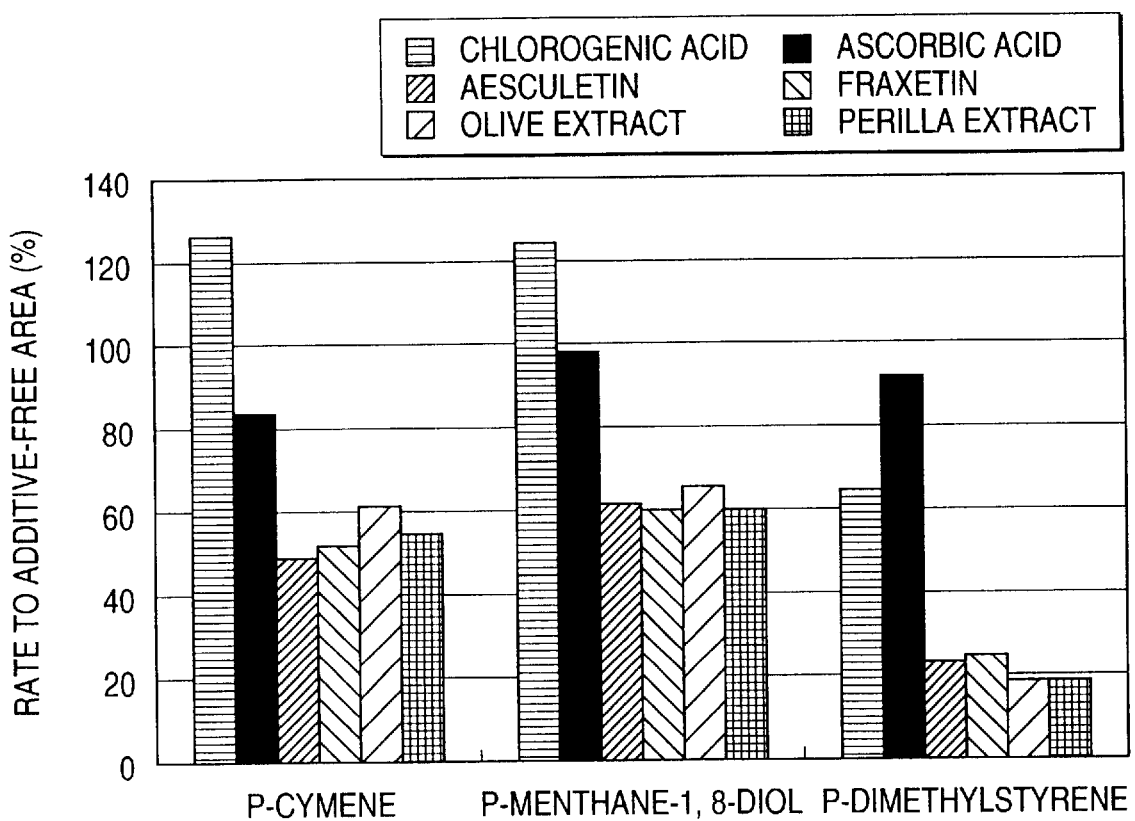

US 6,475,544 B1

ANTI-DETERIORATION AGENT FOR FOOD FLAVORS, METHOD FOR PREVENTING DETERIORATION OF FOOD FLAVORS, AND FOODS CONTAINING ANTI-DETERIORATION AGENT FOR FOOD FLAVORS

FIELD OF THE INVENTION

This invention relates to an anti-deterioration agent for food flavors comprising a specific coumarin derivative; a method for preventing deterioration of food flavors present in foods; and a food of which food flavors are prevented from deterioration.

BACKGROUND OF THE INVENTION

It has been known for a long time that organic matter such as fat and oil suffers from denaturation by oxidation or heat to reduce or lose its essential properties. In order to solve this problem, a large number of antioxidants have been developed and reported to date. For example, BHT (2, 6-di-tert-butyl-p-cresol), ascorbic acid, tocopherol compounds, and the like have been used widely for their excellent antioxidant action.

Flavors are frequently added to foods to satisfy the present consumers tastes, but it has been pointed out that the food flavors added to foods undergo deterioration during the preparation or storage of the foods, resulting in reduction of the flavor or taste. Most of food flavors being organic, it has been attempted to use known antioxidants, such as BHT, α-tocopherol or ascorbic acid, to prevent the food flavors from deterioration. However, BHT and α-tocopherol are inadequate for the needs, and ascorbic acid causes browning of some foods. It has therefore been demanded to develop an agent for preventing deterioration of food flavors (hereinafter referred to as an anti-deterioration agent for food flavors, or more simply, as an anti-deterioration agent) which can prevent deterioration of food flavors without impairing the appearance of the food.

Methods of using chlorogenic acid (Beverage Japan, No. 179, p. 57 et seg. (1966)) or a specific ester (JP-A-9-227456) as an anti-deterioration agent for food flavors have been reported. However, the former method is disadvantageous in that chlorogenic acid should be used in a relatively large amount, a considerable increase of off components of the smell is observed as demonstrated in Comparative Examples hereinafter given, and chlorogenic acid tends to be decomposed by heat to give some odd taste to foods. The latter method needs the anti-deterioration agent in a relatively large amount to achieve a substantial effect on food flavor deterioration.

SUMMARY OF THE INVENTION

An object of the present invention is to provide a compound having excellent ability to prevent deterioration of food flavors present in foodstuffs. In particular it is an object of the invention to provide a compound which is easily miscible with a food and is not separated from a food and does not impair the taste or appearance of the food.

The present inventors have conducted extensive investigation for obtaining a naturally-occurring compound which has excellent properties of preventing deterioration of flavors present in foods. As a result, they have found that specific coumarin derivatives are excellent in preventing deterioration of food flavors. Having continued their study based on this finding, they have discovered compounds which are easily miscible with foods and hardly separated therefrom and do not impair the taste or appearance of foods.

The present invention provides an anti-deterioration agent for food flavors which comprises at least one coumarin derivative represented by formula (I):

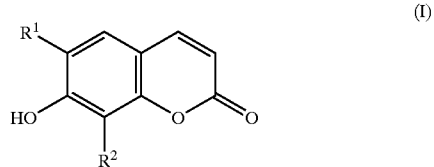

(I)

wherein $R^1$ represents a hydrogen atom, a hydroxyl group or a methoxy group, and $R^2$ represents a hydrogen atom or a hydroxyl group, provided that $R^1$ and R2 do not represent a hydrogen atom simultaneously.

The coumarin derivative represented by formula (I) is preferably selected from 6,7-dihydroxycoumarin represented by formula (II) (aesculetin), 7,8-dihydroxy-6-methoxycoumarin represented by formula (III) (fraxetin), and 7,8-dihydroxycoumarin represented by formula (IV) (daphnetin):

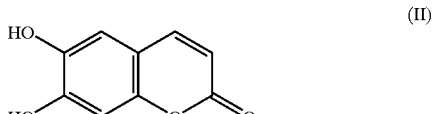

(II)

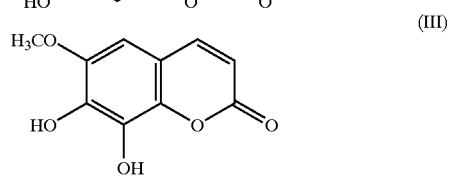

(III)

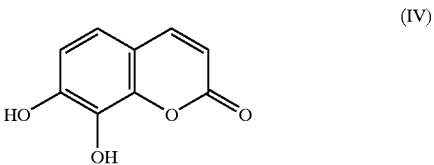

(IV)

The anti-deterioration agent of the invention preferably comprises an olive plant extract containing the coumarin derivative, an extract of the bark of an ash tree (Aesculus turbinata) containing the coumarin derivative, or a perilla plant extract containing the coumarin derivative.

The invention further provides a method for preventing deterioration of food flavors present in a food which comprises incorporating the above-described anti-deterioration agent into the food.

The invention furthermore provides a food containing the above-described anti-deterioration agent.

BRIEF DESCRIPTION OF THE DRAWINGS

FIG. 5 shows relative contents of off components of the smell emitted from a carbonated lemon beverage to which 100 ppm of chlorogenic acid, 100 ppm of ascorbic acid, 1 ppm of aesculetin, 1 ppm of fraxetin, 1 ppm of an olive extract or 1 ppm of a perilla extract had been added and which was subjected to a light deterioration test for 24 hours. The values are relatively presented, taking the results of a comparative sample containing none of antioxidants, anti-deterioration agents for food flavors, and extracts containing an anti-deterioration agent for food flavors as 100%.

DETAILED DESCRIPTION OF THE INVENTION

Figure 1:
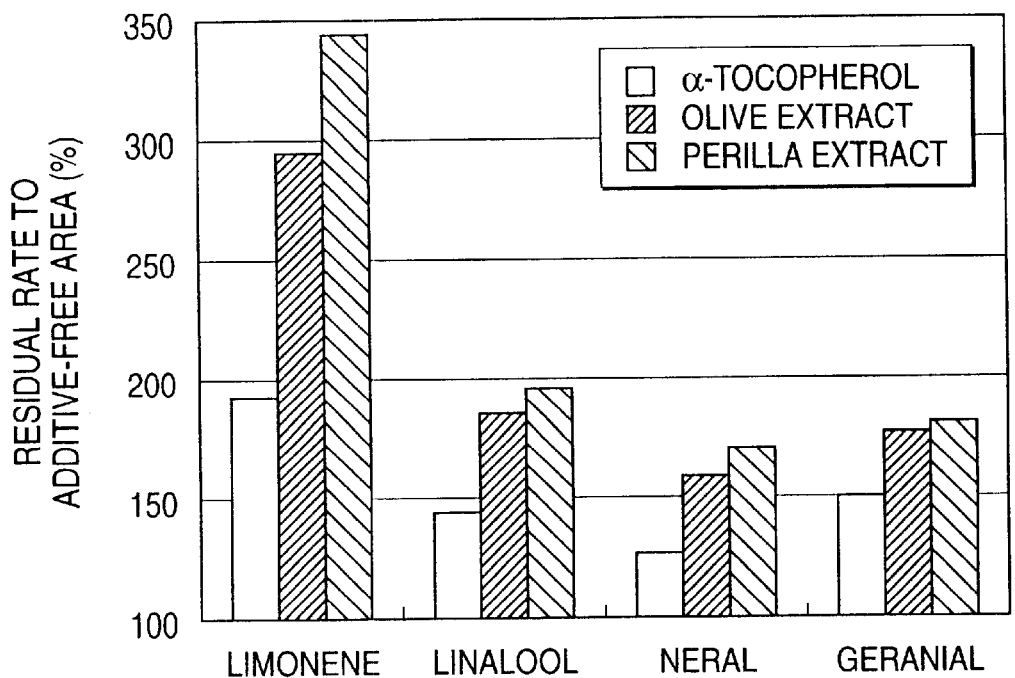
FIG. 1 shows contents of key components of the smell emitted from lemon cold-pressed oil to which 0.2% by weight of α-tocopherol, an olive extract or a perilla extract had been added and which was subjected to a heat and oxygen deterioration test for 24 hours. The values are relatively presented, taking the results of a comparative sample containing none of antioxidants, anti-deterioration agents for food flavors, and extracts containing an anti-deterioration agent for food flavors (Comparative Example 2) as 100%, which also applies to FIG. 2.

The compounds the inventors found excellent in preventing deterioration of food flavors are coumarin derivatives represented by formula (I). The coumarin derivatives of formula (I) include aesculetin of formula (II), fraxetin of formula (III) and daphnetin of formula (IV).

The coumarin derivatives of formula (I) are available from plants in a conventional manner. Plant parts containing the compounds of formula (I) in large quantities are used as a raw material. Examples of plant parts that can be used as a raw material and are easily available are the bark, the leaves or roots of an ash tree (e.g., *Fraxinus japonica*) and the genus Aesculus (e.g., a Japanese horse chestnut tree (*Aesculus turbinata*) and a horse chestnut tree (*Aesculus hippocastanum*)); the leaves and stems of a perilla; the leaves, flowers, stems, bark and roots of the genus Daphne (e.g., *Daphne odora* and *Daphne mezereum*); the bark, the leaves, the stem of the genus Olea (e.g., *Olea europaea* and *Olea Africana*); the flowers of a genista (*Cytisus scoparius*); the roots of the genus Scopolia (e.g., *Scopolia japonica*); and the roots of the family Oenanthe (e.g., *Petroselium crispum* and *Apium graveolens*) Additionally, the leaves of *Pulicaria dysenterica*, the leaves of *Haplopappus multifolius*, the terrestrial parts of Gochnatica argentina, the roots of *Bupleur fruticosum*, and the terrestrial parts of *Pterocaulon purpurascens* also have a relatively high content of the compounds of formula (I).

The plant part is dried, cut into pieces, and immersed in a solvent under certain conditions to extract the desired compound. The solid matter is removed by filtration, and the filtrate is concentrated and purified to obtain the desired compound. Since the compound is mostly present in the plants in the form of a glycoside, the plant part is usually extracted with a hydrous alcohol, and the extract is hydrolyzed to separate the aglycon.

Commercially available compounds of formula (I) can be utilized, or the compounds of formula (I) as synthesized and purified can be used as well.

Preparation of the compounds of formula (I) from a plant will be described in more detail. The above-mentioned plant parts can be used either individually or as a combination of two or more thereof. The part of the plant to be used is not limited as long as it contains the compound in a large amount.

Preferred extracting solvents include water, lower alcohols, hydrous lower alcohols, polyhydric alcohols, petroleum ethers, and hydrocarbons, and mixtures of two or more thereof. The lower alcohols include alcohols having 1 to 4 carbon atoms, particularly methanol and ethanol. The hydrous lower alcohols include those having a water content of 10 to 75% by weight. The polyhydric alcohols include ethylene glycol and propylene glycol. The petroleum ethers include those commonly available on the market. The hydrocarbons include aliphatic, alicyclic or aromatic ones which are liquid at ambient temperature. Aliphatic or aromatic hydrocarbons which are liquid at ambient temperature are preferred. Of such hydrocarbons, n-hexane and toluene are still preferred.

The extracting operation is not particularly restricted. It is usually carried out by immersing the plant in an extracting solvent of choice with or without gentle stirring at a temperature of from room temperature to 80° C., which is subject to variation according to the plant and the solvent. Use of a Soxhlet's extractor or a like apparatus will achieve high efficiency of extraction. The extraction usually completes in about 0.5 to 12 hours. The extraction may be conducted in a multi-stage system known in the art.

The term "extract" as used herein is intended to include not only the extract obtained by the above-described operation but a product obtained by subjecting the extract to some treatment, such as a concentrate of the extract and the extract from which a specific component has been removed. The extract also includes the residue of steam distillation of cut pieces of the leaves, branches, trunks, etc. of the above-described plant.

The extract is then subjected to chromatography to obtain an active fraction. Prior to chromatography, the solvent may be removed from the extract to increase the viscosity, or the extract may be diluted with a solvent. The solvent content is usually adjusted to 0.1 to 30 parts by volume, preferably 0.5 to 20 parts by volume, per part by weight of the extract.

The active fraction can be obtained in a conventional manner. For example, the extract or the pretreated extract is poured into a previously prepared column for chromatography. An eluent comprising a solvent is then poured to elute an adsorbate, and the eluate is collected in divided fractions with a known means. In using an ordinary silica gel column, n-hexane, ethyl acetate or a mixture thereof is used as an eluent. The mixing ratio of the mixed solvent is not particularly limited. Elution is usually carried out at room temperature. Elution may be conducted at lower temperatures.

The eluate is collected in divided fractions with a known means. Each fraction or a combined fraction is evaporated under reduced pressure to remove the solvent, and the concentrate is further purified by high performance liquid chromatography to obtain the coumarin derivative.

The concentrate may be once freeze-dried, and the solid is re-dissolved in a solvent. The sediment is filtered off, and the filtrate is re-concentrated. The concentrate is further purified by high performance liquid chromatography to obtain the coumarin derivative.

In the present invention, one or more than one of the compounds thus isolated can be used as an anti-deterioration agent for food flavors. Further, a plant extract containing the compound(s) can also be used as an anti-deterioration agent for food flavors. Use of a plant extract as such is advantageous not only because the purification operation is not necessary but because the effect of the plant extract is equal or superior to that produced from the isolated compound of formula (I).

Food flavors are well-known flavor components that are originally present in foodstuffs or are externally added to foodstuffs to reproduce intended flavor and taste of foods. Food flavors include natural flavoring materials, such as essential oils, extracts, oleoresins, recovered flavors, and isolated flavors, and artificial flavoring materials, such as alcohols, esters, aldehydes, actals, and lactones. These food flavors are used either individually or as a mixture of two or more thereof.

Of food flavors preferred are, according to a typical classification system, citrus flavors, such as lemon, grapefruit, and orange; soft fruit flavors, such as apple, melon, grape, peach, and pineapple; flavors of beverages, such as tea, green tea, oolong tea, and coffee; flavors of dairy products, vanilla flavors, mint flavors, spice flavors, nuts flavors, meat flavors, and sea food flavors.

The anti-deterioration agent of the invention is also effective on prevention of deterioration of lemon cold-pressed oil, orange cold-pressed oil, etc.

There are a large number of foods which originally contains the food flavors or to which the food flavors are externally added. Illustrative examples are fruit beverages, teas (e.g., tea, green tea, andoolongtea), coffee, coffee with milk (caféau lait), cocoa with milk, dairy products (e.g., yogurt and ice cream), chewing gums, hard candies, soft candies, jelly, and the like. Fruit beverages, tea, green tea, oolong tea, coffee, coffee with milk, cocoa with milk, yogurt and ice cream are particularly preferred.

The amount of the anti-deterioration agent for food flavors to be added to a food is usually 0.1 ppb to 1% by weight, particularly 1 ppb to 0.1% by weight, while varying depending on the kind of the food. The anti-deterioration agent of the present invention is effective in an extremely small amount. Further, the plant extract containing the compound of formula (I) also exhibits excellent anti-deterioration effect on food flavors in the above-described amount.

Since the foods containing the anti-deterioration agent of the invention suffer from little deterioration of the flavors present therein, they keep the smell and taste for an extended period of time. Further, in the presence of the anti-deterioration agent, reduction of key components of the smell is suppressed while production of off components of the smell is minimized, which is advantageous for maintaining the food flavor and taste. This feature is conspicuous in every kind of beverages, especially citrus be verages. The terminology "key components" as used herein means flavor components which volatilize from a food (or a substance) and are characteristic of the food. The terminology "off components" as used herein means components giving off unpleasant odors. Taking citrus beverages for instance, key components of the smell of orange juice include valencene and α-sinensal, and off components of the same include 4-vinylguaiacol and 2, 5-dimethyl-4-hydroxy-3 (2H)-furanone; key components of the smell of lemon juice include neral and geranial, and off components of the same include p-cymene, p-α-dimethylstyrene, and p-methylacetophenone.

The present invention will now be illustrated in greater detail with reference to Examples and Comparative Examples, but it should be understood that the invention is not deemed to be limited thereto. Unless otherwise noted, all the percents are by weight.

COMPARATIVE EXAMPLE 1

Commercially available ci-tocopherol was mixed well into lemon cold-pressed oil in a concentration of 0.2% or 0.01%. The mixture was subjected to a heat and oxygen deterioration test under the same conditions as in Example 1 hereinafter given and then organoleptically evaluated. The results obtained are shown in Table 1 below.

Figure 2:
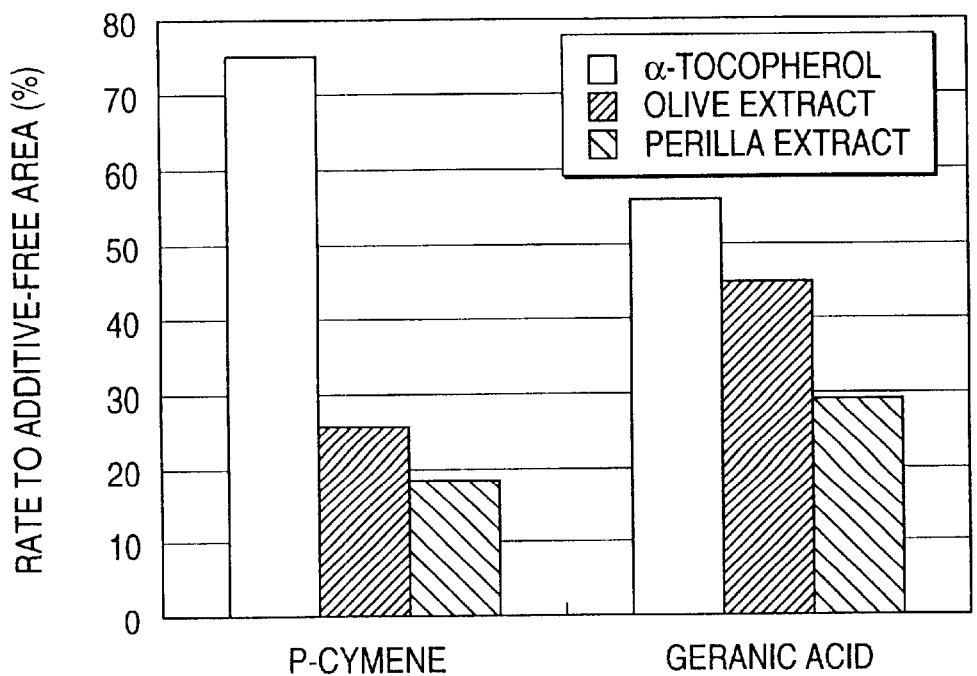
FIG. 2 shows relative contents of off components of the smell emitted from lemon cold-pressed oil to which 0.2% by weight of α-tocopherol, an olive extract or a perilla extract had been added and which was subjected to a heat and oxygen deterioration test for 24 hours.

After the deterioration test, the mixture containing 0.2% α-tocopherol was analyzed to determine key components and off components of the smell in the same manner as in Example 3 hereinafter given. The results obtained are shown in FIGS. 1 and 2.

COMPARATIVE EXAMPLE 2

Lemon cold-pressed oil was subjected to a heat and oxygen deterioration test under the same conditions as in Example 1 and then organoleptically evaluated. The result of the evaluation is shown in Table 1. The mixture after the deterioration test was analyzed to determine key components and off components of the smell in the same manner as in Example 3. The results obtained were used as a standard.

EXAMPLE 1

In 100 ml of ethanol was dissolved 1 g of commercially available aesculetin, and the solution was mixed well into 4 g of lemon cold-pressed oil to give an aesculetin concentration of 0.2% or 0.01%. The mixture was subjected to a heat and oxygen deterioration test under the following conditions. The taste and the smell of the mixture after the deterioration test was organoleptically evaluated by a panel of 10 specialists according to the following rating system. The results obtained are shown in Table 1.

Conditions of deterioration test:
　Temperature: 70° C.
　Oxygen: 20 liter/hr
　Deterioration time: 24 hrs
Rating system:
　A . . . The smell almost unchanged.
　B . . . The smell changed slightly.
　C . . . The smell changed definitely.
　D . . . The smell changed remarkably.

EXAMPLE 2

The same procedure of Example 1 was repeated, except for using a solution of 1 g of fraxetin in 100 ml of ethanol. The results of the organoleptic evaluation after the heat and oxygen deterioration are shown in Table 1.

EXAMPLE 3

Dry olive leaves (100 g) were broken into pieces in a mill and set in a Soxhlet's extractor. 50% Hydrous ethanol (1000 ml) was put in the flask, and extraction was carried out at room temperature for 8 hours. The extract was concentrated and partitioned with 2000 ml of a 1:1 (by volume) mixture of water and n-hexane at room temperature. The mixture was allowed to stand at 5° C. overnight to obtain an aqueous fraction, which was concentrated. The concentrate was dissolved in 50% hydrous ethanol. The yield was 18.0% on a solid basis based on the dry olive.

The same procedure of Example 1 was repeated, except for using the resulting hydrous ethanolic solution. The results of the organoleptic evaluation after the heat and oxygen deterioration test are shown in Table 1.

The mixture after the deterioration test was analyzed by gas chromatography to determine key components and off components of the smell under the following conditions. The results obtained are shown in FIGS. 1 and 2.

Sample: Preparedbymixing1 g of themixture with 1 ml of an ethanol solution containing 3,000 ppm of methyl amyl ketone.

Column: BC-WAX (30 m×0.25 mm; I.D.: 0.25 pm)

Carrier gas: helium

Temperature: 55 up to 210° C. (rate of temperature rise: 4° C./min)

Detector: FID (250°C.)

EXAMPLE 4

A 50% hydrous ethanolic solution was prepared in the same manner as in Example 3, except for replacing the dry olive leaves with dry bark and leaves of a Japanese horse chestnut tree (*Aesculus turbinata*). The yield was 15.6% on a solid basis based on the dry plant parts.

The same procedure of Example 1 was repeated, except for using the resulting hydrous ethanolic solution. The results obtained are shown in Table 1.

EXAMPLE 5

A 50% hydrous ethanolic solution was prepared in the same manner as in Example 3, except for replacing the dry olive leaves with dry leaves and stems of a perilla. The yield was 15.9% on a solid basis based on the dry plant parts.

The same procedure of Example 1 was repeated, except for using the resulting hydrous ethanolic solution. The results obtained are shown in Table 1. Further, the key components and off components of the smell were analyzed in the same manner as in Example 3. The results are shown in FIGS. 1 and 2.

TABLE 1

|  | Anti-deterioration Agent | Concentration (%) | Result of Organoleptic Evaluation |
|---|---|---|---|
| Comp. Ex. 1 | α-tocopherol | 0.2 | C |
|  |  | 0.01 | D |
| Comp. Ex. 2 | none | — | D |
| Ex. 1 | aesculetin | 0.2 | A |
|  |  | 0.01 | B |
| Ex. 2 | fraxetin | 0.2 | A |
|  |  | 0.01 | B |
| Ex. 3 | olive extract | 0.2 | A |
|  |  | 0.01 | B |
| Ex. 4 | Japanese horse chestnut extract | 0.2 | A |
|  |  | 0.01 | B |
| Ex. 5 | perilla extract | 0.2 | A |
|  |  | 0.01 | B |

COMPARATIVE EXAMPLE 3

Figure 3:
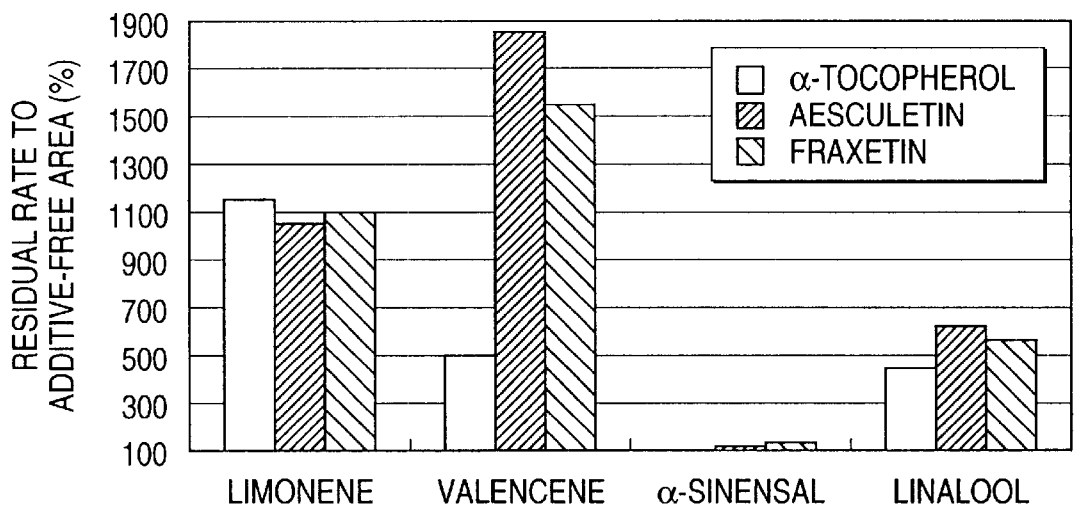
FIG. 3 shows contents of key components of the smell emitted from orange cold-pressed oil to which 0.2% by weight of α-tocopherol, aesculetin or fraxetin had been added and which was subjected to a heat and oxygen deterioration test for 24 hours. The values are relatively presented, taking the results of a comparative sample containing none of antioxidants, anti-deterioration agents for food flavors, and extracts containing an anti-deterioration agent for food flavors (Comparative Example 4) as 100%.

The same procedure of Comparative Example 1 was repeated, except for using orange cold-pressed oil in place of lemon cold-pressed oil. The results of the organoleptic evaluation are shown in Table 2 below, and the results of the analysis on the key components of the smell are shown in FIG. 3.

COMPARATIVE EXAMPLE 4

The same procedure of Comparative Example 2 was repeated, except for using orange cold-pressed oil in place of lemon cold-pressed oil. The results of the organoleptic evaluation are shown in Table 2, and the results of the analysis on the key components of the smell were used as a standard.

EXAMPLE 6

In 100 ml of ethanol was dissolved 1 g of commercially available aesculetin, and the solution was mixed well into 4 g of orange cold-pressed oil to give an aesculetin concentration of 0.2%. The mixture was subjected to the same heat and oxygen deterioration test as in Example 1 and evaluated organoleptically. Further, the key components of the smell were analyzed in the same manner as in Example 3. The results obtained are shown in Table 2 and FIG. 3.

EXAMPLE 7

The procedure of Example 6 was repeated, except for replacing aesculetin with 1 g of commercially available fraxetin. The results of the organoleptic test and the analysis of the key components of the smell are shown in Table 2 and FIG. 3.

TABLE 2

|  | Anti-deterioration Agent | Concentration (%) | Results of Organoleptic Evaluation |
|---|---|---|---|
| Comp. Ex. 3 | α-tocopherol | 0.2 | C |
| Comp. Ex. 4 | none | — | D |
| Ex. 6 | aesculetin | 0.2 | A |
| Ex. 7 | fraxetin | 0.2 | A |

EXAMPLE 8

Carbonated lemon beverage:

| Liquid fructose and dextrose | 127 g |
|---|---|
| Citric acid | 1.24 g |
| Water | 200 ml |
| Lemon flavor | 0.12 g |
| Ethanol solution of aesculetin | prescribed amount (see Table 3) |
| Carbonated water | adequate amount |
| Total | 1,000 ml |

Liquid fructose and dextrose and citric acid were dissolved in water to prepare syrup. Lemon flavor and an ethanol solution of aesculetin were added to the syrup. After stirring, carbonated water was added to make 1,000 ml to prepare a carbonated lemon beverage (Brix: 10.0; gas pressure: 2.5 kg/M$^2$) containing aesculetin.

The carbonated lemon beverage was subjected to a light deterioration test under the following conditions. The taste and the smell of the deteriorated beverage was organoleptically evaluated by a panel of 10 specialists according to the following rating system. The results obtained are shown in Table 3.

Conditions of deterioration test:
  Light quantity: 15,000 lux.hr
  Temperature: 20° C.
  Deterioration time: 7 days
Rating system:
  A . . . The smell and taste almost unchanged.
  B . . . The taste changed slightly.
  C . . . The smell and taste changed definitely.
  D . . . The smell and taste changed remarkably.

Figure 4:
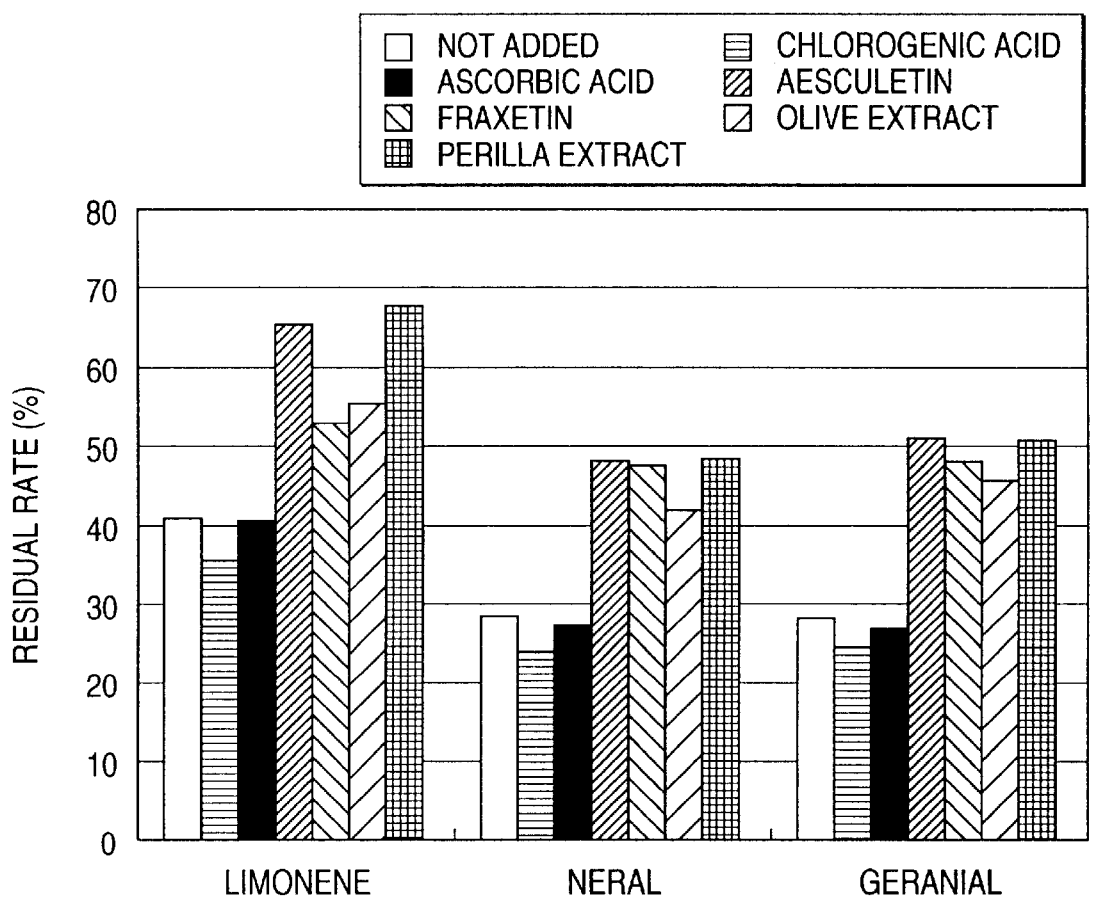
FIG. 4 shows contents of key components of the smell emitted from a carbonated lemon beverage to which 100 ppm of chlorogenicacid, 100 ppm of ascorbic acid, 1 ppm of aesculetin, 1 ppm of fraxetin, 1 ppm of an olive extract or 1 ppm of a perilla extract had been added or none of them had been added and which was subjected to a light deterioration test for 24 hours.

Further, the carbonated lemon beverage after the deterioration test was analyzed by gas chromatography under the following conditions to determine the key components and the off components of the smell. The results obtained are shown in FIGS. 4 and 5. Sample:

To 1 liter of the carbonated lemon beverage after the deterioration test was added 30 μl of an ethanol solution containing 7,000 ppm of methyl amyl ketone, and the mixture was passed through a solid phase column (Mega Bond Elut $C_{16}$, available from Varian). The column was washed with water, dried by suction for 1 hour, and eluted with diethyl ether. The eluate was bubbled with nitrogen gas, and the solvent was evaporated. To the residue was added 30 μl of ethanol to prepare a sample.

Column: BC-WAX (30 m×0.25 mm; I.D.: 0.25 μm)
  Carrier gas: helium
  Temperature: 55 up to 210° C. (rate of temperature rise: 4° C./min)
  Detector: FID (250° C.)

EXAMPLE 9

A carbonated lemon beverage containing fraxetin was prepared in the same manner as in Example 8. The carbonated lemon beverage was subjected to a light deterioration test and organoleptically evaluated in the same manner as in Example 8. The results are shown in Table 3. Further, the key components and off components of the smell were analyzed in the same manner as in Example 8. The results of the analysis are shown in FIGS. 4 and 5.

EXAMPLE 10

A carbonated lemon beverage containing daphnetin was prepared in the same manner as in Example 8. The carbonated lemon beverage was subjected to a light deterioration test and organoleptically evaluated in the same manner as in Example 8. The results are shown in Table 3.

EXAMPLE 11

A carbonated lemon beverage containing the plant extract of Example 3 was prepared in the same manner as in Example 8. The carbonated lemon beverage was subjected to a light deterioration test and organoleptically evaluated in the same manner as in Example 8. The results are shown in Table 3. Further, the key components and off components of the smell were analyzed in the same manner as in Example 8. The results of the analysis are shown in FIGS. 4 and 5.

EXAMPLE 12

A carbonated lemon beverage containing the plant extract of Example 4 was prepared in the same manner as in Example 8. The carbonated lemon beverage was subjected to a light deterioration test and organoleptically evaluated in the same manner as in Example 8. The results are shown in Table 3.

EXAMPLE 13

A carbonated lemon beverage containing the plant extract of Example 5 was prepared in the same manner as in Example 8. The carbonated lemon beverage was subjected to a light deterioration test and organoleptically evaluated in the same manner as in Example 8. The results are shown in Table 3. Further, the key components and off components of the smell were analyzed in the same manner as in Example 8. The results of the analysis are shown in FIGS. 4 and 5.

COMPARATIVE EXAMPLE 5

A carbonated lemon beverage was prepared in the same manner as in Example 8, except that the ethanolic solution of aesculetin was not used. The carbonated lemon beverage was subjected to a light deterioration test and organoleptically evaluated in the same manner as in Example 8. The results are shown in Table 3. Further, the key components and off components of the smell were analyzed in the same manner as in Example 8. The results of the analysis are shown in FIGS. 4 and 5.

COMPARATIVE EXAMPLE 6

A carbonated lemon beverage was prepared in the same manner as in Example 8, except that chlorogenic acid was used in place of the ethanolic solution of aesculetin. The carbonated lemon beverage was subjected to a light deterioration test and organoleptically evaluated in the same manner as in Example 8. The results are shown in Table 3. Further, the key components and off components of the smell were analyzed in the same manner as in Example 8. The results of the analysis are shown in FIGS. 4 and 5.

COMPARATIVE EXAMPLE 7

A carbonated lemon beverage was prepared in the same manner as in Example 8, except that ascorbic acid was used in place of the ethanolic solution of aesculetin. The carbonated lemon beverage was subjected to a light deterioration test and organoleptically evaluated in the same manner as in Example 8. The results are shown in Table 3. Further, the key components and off components of the smell were analyzed in the same manner as in Example 8. The results of the analysis are shown in FIGS. 4 and 5.

COMPARATIVE EXAMPLE 8

A carbonated lemon beverage containing p-menth-8-en-7-yl 3-(3,4-dihydroxyphenyl)-2-propenoate was prepared in the same manner as in Example 8, except for replacing the ethanolic solution of aesculetin with the ester. The carbonated lemon beverage was subjected to a light deterioration test and organoleptically evaluated in the same manner as in Example 8. The results are shown in Table 3.

TABLE 3

|  | Anti-deterioration Agent | Concentration (ppm) | Results of Organoleptic Evaluation |
|---|---|---|---|
| Comp. Ex. 5 | none | — | D |
| Comp. Ex. 6 | chlorogenic acid | 100 | A |
|  |  | 50 | B |
|  |  | 30 | D |
| Comp. Ex. 7 | ascorbic acid | 100 | D |
| Comp. Ex. 8 | p-menth-8-en-7-yl 3-(3,4-dihydroxyphenyl)-2-propenoate | 1 | C |

TABLE 3-continued

| | Anti-deterioration Agent | Concentration (ppm) | Results of Organoleptic Evaluation |
|---|---|---|---|
| Ex. 8 | aesculetin | 1 | A |
| | | 0.1 | A |
| | | 0.01 | B |
| Ex. 9 | fraxetin | 1 | A |
| | | 0.1 | A |
| | | 0.01 | B |
| Ex. 10 | daphnetin | 1 | A |
| | | 0.1 | A |
| | | 0.01 | B |
| Ex. 11 | olive extract | 10 | A |
| | | 1 | B |
| | | 0.1 | B |
| | | 0.01 | B |
| Ex. 12 | Japanese horse chestnut extract | 10 | A |
| | | 1 | B |
| | | 0.1 | B |
| | | 0.01 | B |
| Ex. 13 | perilla extract | 10 | A |
| | | 1 | B |
| | | 0.1 | B |
| | | 0.01 | B |

EXAMPLE 14

The carbonated lemon beverage prepared in Example 8 was subjected to a heat deterioration test under the following conditions and organoleptically evaluated by a panel of 10 specialists according to the following rating system. The results obtained are shown in Table 4.

Conditions of deterioration test:
In a dark room at 37° C. for 7 days
Rating system:
A . . . The smell and taste almost unchanged.
B . . . The taste changed slightly.
C . . . The taste and smell changed definitely.
D . . . The taste and smell changed remarkably.

EXAMPLES 15 AND 16

The carbonated lemon beverages prepared in Examples 9 and 10 were subjected to a heat deterioration test and organoleptically evaluated in the same manner as in Example 14. The results obtained are shown in Table 4.

EXAMPLES 17 TO 19

The carbonated lemon beverages prepared in Examples 11, 12 and 13 were subjected to a heat deterioration test and organoleptically evaluated in the same manner as in Example 14. The results obtained are shown in Table 4.

COMPARATIVE EXAMPLE 9

A carbonated lemon beverage prepared in the same manner as in Example 8 except for containing no aesculetin was subjected to a heat deterioration test and organoleptically evaluated in the same manner as in Example 14. The results obtained are shown in Table 4.

COMPARATIVE EXAMPLE 10

The carbonated lemon beverage prepared in Comparative Example 6 was subjected to a heat deterioration test and organoleptically evaluated in the same manner as in Example 14. The results obtained are shown in Table 4.

COMPARATIVE EXAMPLE 11

The carbonated lemon beverage prepared in Comparative Example 7 was subjected to a heat deterioration test and organoleptically evaluated in the same manner as in Example 14. The results obtained are shown in Table 4.

TABLE 4

| | Anti-deterioration Agent | Concentration (ppm) | Results of Organoleptic Evaluation |
|---|---|---|---|
| Comp. Ex. 9 | none | — | D |
| Comp. Ex. 10 | chlorogenic acid | 100 | D |
| Comp. Ex. 11 | ascorbic acid | 100 | D |
| Ex. 14 | aesculetin | 1 | A |
| | | 0.1 | A |
| | | 0.01 | B |
| Ex. 15 | fraxetin | 1 | A |
| | | 0.1 | A |
| | | 0.01 | B |
| Ex. 16 | daphnetin | 1 | A |
| | | 0.1 | A |
| | | 0.01 | B |
| Ex. 17 | olive extract | 10 | A |
| | | 1 | A |
| | | 0.1 | B |
| Ex. 18 | Japanese horse chestnut extract | 10 | A |
| | | 1 | A |
| | | 0.1 | B |
| Ex. 19 | perilla extract | 10 | A |
| | | 1 | A |
| | | 0.1 | B |

EXAMPLE 20

Aesculetin was added to tea in the amount shown in Table 5 below to prepare a tea beverage, which was sterilized in a retort at 124° C. for 20 minutes. A portion of the sterilized beverage was kept in a thermostat set at 60° C. for 3 weeks. The retort-sterilized sample and the sample having been kept in the thermostat were organoleptically evaluated by a panel of 10 specialists according to the following rating system. The results obtained are shown in Table 5.

Rating system:
A . . . The aroma and taste almost unchanged.
B . . . The taste changed slightly.
C . . . The taste and aroma changed definitely.
D . . . The taste and aroma changed remarkably.

EXAMPLES 21 AND 22

An olive extract or a perilla extract was added to tea in the amount shown in Table 5 below to prepare tea beverages, which were processed and evaluated in the same manner as in Example 20. The results are shown in Table 5.

COMPARATIVE EXAMPLE 12

Tea containing no anti-deterioration agent was processed and evaluated in the same manner as in Example 20. The results obtained are shown in Table 5.

TABLE 5

| | Anti-deterioration Agent | Concentration (ppm) | Sample A* | Sample B** |
|---|---|---|---|---|
| Comp. Ex. 12 | none | — | D | D |
| Ex. 20 | aesculetin | 10 | B | B |
| | | 0.1 | B | B |

TABLE 5-continued

| | Anti-deterioration Agent | Concentration (ppm) | Sample A* | Sample B** |
|---|---|---|---|---|
| Ex. 21 | olive extract | 0.8 | B | B |
| Ex. 22 | perilla extract | 0.8 | B | B |

*Retort-sterilized sample
**Retort-sterilized sample having been kept at 60° C. × 3 weeks

EXAMPLE 23

A tea with milk beverage containing an olive extract was prepared according to the following formulation (Brix: 8; pH: 6.6, adjusted with sodium hydrogencarbonate).

| | |
|---|---|
| Extract of tea (Uva) leaves (Brix: 8.5) | 300.0 g |
| Granulated sugar | 45.0 g |
| Milk | 250.0 g |
| Emulsifier (fatty acid ester) | 0.3 g |
| Tea flavor | 1.0 g |
| Milk flavor | 0.8 g |
| Olive extract | see Table 6 |
| Water | adequate amount |
| Total | 1000 g |

Granulated sugar, milk, the emulsifier, the tea flavor and the milk flavor were added to the Uva tea leaves extract. After stirring the mixture, the olive extract was added. Water was added to make 1,000 g. The resulting tea with milk was sterilized at 124° C. for 20 minutes and subjected to a heat deterioration test under conditions of 55° C.×2 weeks. The taste and the smell of the tested tea with milk were organoleptically evaluated by a panel of 4 specialists according to the following rating system in comparison with the same sample having been stored at 5° C. for 2 weeks. The results obtained are shown in Table 6.

Rating system:
A . . . The smell and taste almost unchanged.
B . . . The taste changed slightly.
C . . . The smell and taste changed definitely.
D . . . The smell and taste changed remarkably.

EXAMPLE 24

A tea with milk beverage containing a Japanese horse chestnut extract was prepared in the same manner as in Example 23. The resulting beverage was tested and evaluated in the same manner as in Example 23. The results are shown in Table 6.

EXAMPLE 25

A tea with milk beverage containing a perilla extract was prepared in the same manner as in Example 23. The resulting beverage was tested and evaluated in the same manner as in Example 23. The results are shown in Table 6.

COMPARATIVE EXAMPLE 13

A tea with milk beverage was prepared in the same manner as in Example 23, except that the olive extract was not added. The resulting beverage was tested and evaluated in the same manner as in Example 23. The results are shown in Table 6.

COMPARATIVE EXAMPLE 14

A tea with milk beverage containing chlorogenic acid was prepared in the same manner as in Example 23, except that the olive extract was replaced with chlorogenic acid. The resulting tea with milk was tested and evaluated in the same manner as in Example 23. The results are shown in Table 6.

COMPARATIVE EXAMPLE 15

A tea with milk beverage containing ascorbic acid was prepared in the same manner as in Example 23, except that the olive extract was replaced with ascorbic acid. The resulting tea with milk was tested and evaluated in the same manner as in Example 23. The results are shown in Table 6.

TABLE 6

| | Anti-deterioration Agent | Concentration (ppm) | Results of Organoleptic Evaluation |
|---|---|---|---|
| Comp. Ex. 13 | none | — | D |
| Comp. Ex. 14 | chlorogenic acid | 100 | D |
| Comp. Ex. 15 | ascorbic acid | 100 | D |
| Ex. 23 | olive extract | 10 | A |
| Ex. 24 | Japanese horse chestnut extract | 10 | A |
| Ex. 25 | perilla extract | 10 | A |

EXAMPLE 26

A coffee with milk beverage containing an olive extract (Brix: 9.3; pH: 6.8, adjusted with sodium hydrogencarbonate) was prepared according to the following formulation.

| | |
|---|---|
| Coffee | 50.0 g |
| Granulated sugar | 50.0 g |
| Milk | 150.0 g |
| Emulsifier (fatty acid ester) | 0.5 g |
| Coffee flavor | 1.0 g |
| Milk flavor | 0.8 g |
| Olive extract | see Table 7 |
| Water | adequate amount |
| Total | 1000 g |

Coffee, granulated sugar, milk, the emulsifier, the coffee flavor, and the milk flavor were mixed up by stirring, and the olive extract was added. Water was added to make 1,000 g The resulting coffee with milk beverage was sterilized at 124° C. for 20 minutes and subjected to a heat deterioration test and organoleptically evaluated in the same manner as in Example 23. The results obtained are shown in Table 7.

EXAMPLE 27

A coffee with milk beverage containing a Japanese horse chestnut extract was prepared in the same manner as in Example 26. The resulting coffee with milk beverage was tested and evaluated in the same manner as in Example 23. The results are shown in Table 7.

EXAMPLE 28

A coffee with milk beverage containing a perilla extract was prepared in the same manner as in Example 26. The resulting coffee with milk beverage was tested and evaluated in the same manner as in Example 23. The results are shown in Table 7.

COMPARATIVE EXAMPLE 16

A coffee with milk beverage was prepared in the same manner as in Example 26, except that the olive extract was not added. The resulting coffee with milk beverage was tested and evaluated in the same manner as in Example 23. The results are shown in Table 7.

COMPARATIVE EXAMPLE 17

A coffee with milk beverage containing chlorogenic acid was prepared in the same manner as in Example 26, except for replacing the olive extract with chlorogenic acid. The resulting coffee with milk beverage was tested and evaluated in the same manner as in Example 23. The results are shown in 5 Table 7.

COMPARATIVE EXAMPLE 18

A coffee with milk beverage containing ascorbic acid was prepared in the same manner as in Example 26, except that for replacing the olive extract with ascorbic acid. The resulting coffee with milk beverage was tested and evaluated in the same manner as in Example 23. The results are shown in Table 7.

TABLE 7

|  | Anti-deterioration Agent | Concentration (ppm) | Results of Organoleptic Evaluation |
| --- | --- | --- | --- |
| Comp. Ex. 16 | none | — | D |
| Comp. Ex. 17 | chlorogenic acid | 100 | D |
| Comp. Ex. 18 | ascorbic acid | 100 | D |
| Ex. 26 | olive extract | 10 | B |
| Ex. 27 | Japanese horse chestnut extract | 10 | B |
| Ex. 28 | perilla extract | 10 | B |

EXAMPLE 29

A cocoa with milk beverage containing an olive extract was prepared according to the following formulation (Brix: 10.3; pH: 6.8, adjusted with sodium hydrogencarbonate).

| | |
| --- | --- |
| Cocoa powder | 10.0 g |
| Granulated sugar | 65.0 g |
| Milk | 250.0 g |
| Emulsifier (fatty acid ester) | 0.3 g |
| Stabilizer (carrageenan) | 0.2 g |
| Edible salt | 0.3 g |
| Cocoa flavor | 1.0 g |
| Milk flavor | 0.8 g |
| Olive extract | see Table 8 |
| Water | adequate amount |
| Total | 1000 g |

Cocoa powder, granulated sugar, milk, the emulsifier, the stabilizer, edible salt, the cocoa flavor and the milk flavor were mixed up by stirring, and the olive extract was added. Water was added to make 1,000 g.

The resulting cocoa with milk beverage was sterilized at 124° C. for 20 minutes and subjected to a heat deterioration test and organoleptically evaluated in the same manner as in Example 23. The results are shown in Table 8.

EXAMPLE 30

A cocoa with milk beverage containing a Japanese horse chestnut extract was prepared in the same manner as in Example 29. The resulting cocoa with milk beverage was tested and evaluated in the same manner as in Example 23. The results are shown in Table 8.

EXAMPLE 31

A cocoa with milk beverage containing a perilla extract was prepared in the same manner as in Example 29. The resulting cocoa with milk beverage was tested and evaluated in the same manner as in Example 23. The results are shown in Table 8.

COMPARATIVE EXAMPLE 19

A cocoa with milk beverage was prepared in the same manner as in Example 29, except that the olive extract was not added. The resulting cocoa with milk beverage was tested and evaluated in the same manner as in Example 23. The results are shown in Table 8.

COMPARATIVE EXAMPLE 20

A cocoa with milk beverage containing chlorogenic acid was prepared in the same manner as in Example 29, except for replacing the olive extract with chlorogenic acid. The resulting cocoa with milk beverage was tested and evaluated in the same manner as in Example 23. The results are shown in Table 8.

COMPARATIVE EXAMPLE 21

A cocoa with milk beverage containing ascorbic acid was prepared in the same manner as in Example 29, except for replacing the olive extract with ascorbic acid. The resulting cocoa with milk beverage was tested and evaluated in the same manner as in Example 23. The results are shown in Table 8.

TABLE 8

|  | Anti-deterioration Agent | Concentration (ppm) | Results of Organoleptic Evaluation |
| --- | --- | --- | --- |
| Comp. Ex. 19 | none | — | D |
| Comp. Ex. 20 | chlorogenic acid | 100 | D |
| Comp. Ex. 21 | ascorbic acid | 100 | D |
| Ex. 29 | olive extract | 10 | B |
| Ex. 30 | Japanese horse chestnut extract | 10 | B |
| Ex. 31 | perilla extract | 10 | B |

EXAMPLE 32

Liquid fructose and dextrose was added to commercially available yogurt (NATURE, available from Snow Brand Milk Products Co., Ltd.) to a concentration of 10%. After stirring, a lemon flavor was added to a concentration of 0.1%. An olive extract was further added and stirred.

After the thus prepared yogurt was preserved at 5° C. for 2 weeks, the taste and the smell were organoleptically evaluated according to the following rating system by a panel of 4 specialists in comparison with yogurt prepared in the same manner on the day of evaluation. The results are shown in Table 9.

Rating system:
A . . . The smell and taste almost unchanged.
B . . . The taste changed slightly.
C . . . The smell and taste changed definitely.
D . . . The smell and taste changed remarkably.

EXAMPLE 33

Yogurt containing a Japanese horse chestnut extract was prepared and organoleptically evaluated in the same manner as in Example 32. The results are shown in Table 9.

EXAMPLE 34

Yogurt containing a perilla extract was prepared and organoleptically evaluated in the same manner as in Example 23. The results are shown in Table 9.

COMPARATIVE EXAMPLE 22

Yogurt was prepared in the same manner as in Example 32, except that the olive extract was not added. The resulting yogurt was organoleptically evaluated in the same manner as in Example 32. The results are shown in Table 9.

COMPARATIVE EXAMPLE 23

Yogurt containing chlorogenic acid was prepared in the same manner as in Example 32, except for replacing the olive extract with chlorogenic acid. The resulting yogurt was organoleptically evaluated in the same manner as in Example 32. The results are shown in Table 9.

COMPARATIVE EXAMPLE 24

Yogurt containing ascorbic acid was prepared in the same manner as in Example 32, except for replacing the olive extract with ascorbic acid. The resulting yogurt was organoleptically evaluated in the same manner as in Example 32. The results are shown in Table 9.

TABLE 9

| | Anti-deterioration Agent | Concentration (ppm) | Results of Organoleptic Evaluation |
|---|---|---|---|
| Comp. Ex. 22 | none | — | D |
| Comp. Ex. 23 | chlorogenic acid | 100 | C |
| Comp. Ex. 24 | ascorbic acid | 100 | D |
| Ex. 32 | olive extract | 5 | A |
| Ex. 33 | Japanese horse chestnut extract | 5 | A |
| Ex. 34 | perilla extract | 5 | A |

Foods having incorporated therein the coumarin derivative of formula (I) as an anti-deterioration agent for food flavors less suffer from deterioration of the flavors and keep the flavors for an extended period of time. Where the anti-deterioration agent of the invention is added to fruit juices, teas, coffee, dairy products, etc., particularly citrus beverages, the key components of the smell reduce less, and the off components of the smell increase less so that the flavor and taste of the food last long.

What is claimed is:

1. A method for preventing deterioration of food flavors present in a food comprising incorporating into the food which contains a food flavor and an anti-deterioration agent for food flavors which comprises at least one coumarin derivative represented by formula (I):

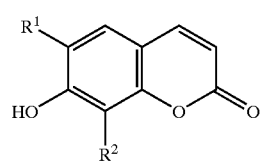

wherein $R^1$ represents a hydrogen atom, a hydroxyl group or a methoxy group, and $R^2$ represents a hydrogen atom or a hydroxyl group, provided that $R^1$ and $R^2$ do not represent a hydrogen atom simultaneously, wherein an amount of said anti-deterioration agent for food flavors ranges from 0.1 ppb to 1% by weight.

2. The method according to claim 1, wherein the coumarin derivative is 6,7-dihydroxycoumarin, 7,8-dihydroxy-6-methoxycoumarin or 7,8-dihydroxcoumarin.

3. A. The method according to claim 1, wherein the anti-deterioration agent for food flavors comprises an olive plant extract containing the coumarin derivative.

4. The method according to claim 1, wherein the anti-deterioration agent for food flavors comprises an extract of the bark of a Japanese horse chestnut tree (*Aesculus turbinata*) containing the coumarin derivative.

5. The method according to claim 1, wherein the anti-deterioration agent for food flavors comprises a perilla plant extract containing the coumarin derivative.

6. The method according to claim 1, wherein the anti-deterioration agent for food flavors comprises an extract of a plant selected from the group consisting of the bark or roots of an ash tree and the flowers of a genista, wherein said extract contains the coumarin derivative.

7. The method according to claim 1, wherein the anti-deterioration agent for food flavors comprises an extract of a plant selected from the group consisting of the genus Daphne, the genus Olea, the roots of the genus Scopolia and the roots of the family Oenanthe, wherein said extract contains the coumarin derivative.

8. The method according to claim 1, wherein the anti-deterioration agent for food flavors comprises an extract of a plant selected from the group consisting of the bark or roots of the genus Aesculus, the leaves of *Pulicaria dysenterica*, the leaves of *Haplopappus multifolius*, the terrestrial parts of *Gochnatica argentina*, the terrestrial parts of *Pterocaulon purpurascens* and the roots of Bupleurum fruticosum, wherein said extract contains the coumarin derivative.

9. A food containing, a food flavor and anti-deterioration agent for food flavors, wherein the anti-deterioration agent comprises at least one coumarin derivative represented by formula (I):

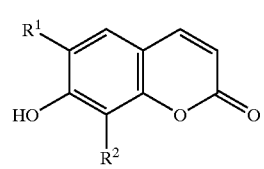

wherein $R^1$ represents a hydrogen atom, a hydroxyl group or a methoxy group, and $R^2$ represents a hydrogen atom or a hydroxyl group, provided that $R^1$ and $R^2$ do not represent a hydrogen atom simultaneously, and an amount of said anti-deterioration agent for food flavors ranges from 0.1 ppb to 1% by weight.

10. The food according to claim 9, wherein the coumarin derivative is 6,7-dihydroxycoumarin, 7,8-dihydroxy-6-methoxycoumarin or 7,8-dihydroxycoumarin.

11. The food according to claim 9, wherein the anti-deterioration agent for food flavors comprises an olive plant extract containing the coumarin derivative.

12. The food according to claim 9, wherein the anti-deterioration agent for food flavors comprises an extract of the bark of a Japanese horse chestnut tree (*Aesculus turbinata*) containing the coumarin derivative.

13. The food according to claim 9, wherein the anti-deterioration agent for food flavors comprises a perilla plant extract containing the coumarin derivative.

14. The food according claim 9, wherein the anti-deterioration agent for food food flavors comprises an extract of a plant selected from the group consisting of the bark or roots of an ash tree, and the flowers of a genista, wherein said extract contains the coumarin derivative.

15. The food according to claim 9, wherein the anti-deterioration agent for food flavors comprises an extract of a plant selected from the group consisting of the genus Daphne, the genus Olea, the roots of the genus Scopolia and the roots of the family Oenanthe, wherein said extract contains the coumarin derivative.

16. The food according to claim 9, wherein the anti-deterioration agent for food flavors comprises an extract of a plant selected from the group consisting of the bark or roots of the genus Aesculus, the leaves of *Pulicaria dysenterica*, the leaves of *Haplopappus multifolius*, the terrestrial parts of *Gochnatica argentina*, the terrestrial parts of *Pterocaulon purpurascens* and the roots of *Bupleurum fruticosum*, wherein said extract contains the coumarin derivative.

* * * * *